(12) United States Patent
Kim

(10) Patent No.: US 10,442,415 B2
(45) Date of Patent: Oct. 15, 2019

(54) VEHICLE CONTROL APPARATUS AND CONTROL METHOD THEREOF

(71) Applicant: MANDO CORPORATION, Gyeonggi-do (KR)

(72) Inventor: Seok-Jong Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/683,722

(22) Filed: Aug. 22, 2017

(65) Prior Publication Data

US 2018/0056956 A1   Mar. 1, 2018

(30) Foreign Application Priority Data

Aug. 24, 2016 (KR) .......................... 10-2016-0107566

(51) Int. Cl.
*B60T 8/40* (2006.01)
*B60T 7/04* (2006.01)
*B60T 13/68* (2006.01)

(52) U.S. Cl.
CPC ............ *B60T 8/409* (2013.01); *B60T 7/042* (2013.01); *B60T 13/686* (2013.01); *B60T 8/4081* (2013.01); *B60T 2220/04* (2013.01)

(58) Field of Classification Search
CPC .... B60T 8/4072; B60T 8/4081; B60T 8/4086; B60T 8/409; B60T 7/04; B60T 7/042; B60T 13/68; B60T 13/686
See application file for complete search history.

(56) References Cited

U.S. PATENT DOCUMENTS

| 5,261,730 A * | 11/1993 | Steiner ...................... B60T 7/12 303/113.4 |
| 6,345,871 B1 * | 2/2002 | Harris ..................... B60T 8/321 303/113.4 |

(Continued)

FOREIGN PATENT DOCUMENTS

EP    1 004 492     1/2006
KR   10-1672037   10/2016

*Primary Examiner* — Thomas J Williams
(74) *Attorney, Agent, or Firm* — Ladas & Parry, LLP

(57) ABSTRACT

Disclosed herein is a vehicle control apparatus and a control method thereof. The vehicle control apparatus and the control method thereof includes: an inputter configured to receive an operation signal of an anti-lock brake system (ABS) and an operation signal of a pedal stroke which are detected by a detector, and a current value of a reaction force of a pedal simulator; a determiner configured to determine whether or not the input operation signal of the ABS is in an ABS control started state according to a driver's braking will, whether or not the input operation signal of the pedal stroke is in a pedal travel increasing state, and whether or not the input current value of the reaction force of the pedal simulator is a target pressure value needed to generate an ABS pedal feeling; and a controller configured to control a simulator valve to generate an ABS pedal feeling corresponding to a current value of a reaction force of the pedal simulator changed by alternate opening and closing operations of the simulator valve and transmit the ABS pedal feeling to a pedal when the input operation signal of an ABS is in the ABS control started state, the input operation signal of the pedal stroke is in the pedal travel increasing state, and the input current value of the reaction force of the pedal simulator is the target pressure value.

10 Claims, 8 Drawing Sheets

(56) References Cited

U.S. PATENT DOCUMENTS

| | | | | |
|---|---|---|---|---|
| 9,415,758 B2* | 8/2016 | Drumm | ............... | B60T 17/22 |
| 2002/0084693 A1* | 7/2002 | Isono | ............... | B60T 8/4081 |
| | | | | 303/113.1 |
| 2011/0006593 A1* | 1/2011 | Sakai | ............... | B60T 8/4081 |
| | | | | 303/6.01 |
| 2015/0120161 A1* | 4/2015 | Kamiya | ............... | B60T 7/042 |
| | | | | 701/70 |

* cited by examiner

VEHICLE CONTROL APPARATUS AND CONTROL METHOD THEREOF

CROSS-REFERENCE TO RELATED APPLICATION

This application claims the benefit of Korean Patent Application No. 2016-0107566, filed on Aug. 24, 2016 in the Korean Intellectual Property Office, the disclosure of which is incorporated herein by reference.

BACKGROUND

1. Field

Embodiments of the present disclosure relate to a vehicle control apparatus and a control method thereof.

2. Description of the Related Art

In general, a conventional apparatus having an anti-lock brake system (ABS) is provided for preventing wheels from locking when a vehicle is suddenly braked.

Such a conventional apparatus having an ABS repeatedly performs proper pressing and decompressing according to wheel slip due to a vehicle speed and wheel speeds to stably provide braking performance.

However, the conventional apparatus having an ABS has a limitation in providing a realistic ABS pedal feeling that a driver wants when ABS control is started according to a driver's braking will.

For one example, the conventional apparatus having an ABS has a limitation in providing a realistic ABS pedal feeling that a driver wants in a pedal simulation system in which a master booster is used to generate a reaction force similar to a brake pedal feeling according to the driver's braking will when ABS control is started according to the driver's braking will.

Recently, studies for vehicle control apparatuses and control methods thereof have been continuously conducted to provide a realistic ABS pedal feeling that a driver wants based on a change in a reaction force of a pedal simulator when ABS control is started according to the driver's braking will.

SUMMARY

Therefore, it is an aspect of the present disclosure to provide a vehicle control apparatus capable of providing a realistic ABS pedal feeling that a driver wants when ABS control is started according to the driver's braking will and a control method thereof.

In addition, it is also an aspect of the present disclosure to provide a vehicle control apparatus capable of suppressing anxiety about a current ABS pedal feeling that a driver feels while inducing the driver to drive carefully and a control method thereof.

Additional aspects of the disclosure will be set forth in part in the description which follows and, in part, will be obvious from the description, or may be learned by practice of the disclosure.

In accordance with one aspect of the present disclosure, a vehicle control apparatus includes: an inputter configured to receive an operation signal of an anti-lock brake system (ABS) and an operation signal of a pedal stroke which are detected by a detector, and a current value of a reaction force of a pedal simulator; a determiner configured to determine whether or not the input operation signal of the ABS is in an ABS control started state according to a driver's braking will, whether or not the input operation signal of the pedal stroke is in a pedal travel increasing state, and whether or not the input current value of the reaction force of the pedal simulator is a target pressure value needed to generate an ABS pedal feeling; and a controller configured to control a simulator valve to generate an ABS pedal feeling corresponding to a current value of a reaction force of the pedal simulator changed by alternate opening and closing operations of the simulator valve and transmit the ABS pedal feeling to a pedal when the input operation signal of an ABS is in the ABS control started state, the input operation signal of a pedal stroke is in the pedal travel increasing state, and the input current value of the reaction force of the pedal simulator is the target pressure value.

The controller may control the simulator valve to generate an ABS pedal feeling corresponding to a current value of a reaction force of the pedal simulator raised to a first threshold pressure level of the target pressure value and transmit the ABS pedal feeling to the pedal during a closing operation section of the simulator valve.

The controller may control the simulator valve to generate an ABS pedal feeling corresponding to a current value of a reaction force of the pedal simulator lowered to a second threshold pressure level of the target pressure value and transmit the ABS pedal feeling to the pedal during an opening operation section of the simulator valve.

The controller may transmit an opening operation signal to the simulator valve at a time at which a current value of a reaction force of the pedal simulator reaches a first threshold pressure level of the target pressure value.

The controller may transmit a closing operation signal to the simulator valve at a time at which a current value of a reaction force of the pedal simulator reaches a second threshold pressure level of the target pressure value.

In accordance with another aspect of the present disclosure, a vehicle control method includes: inputting an operation signal of an anti-lock brake system (ABS) and an operation signal of a pedal stroke which are detected by a detector, and a current value of a reaction force of a pedal simulator; determining whether or not the input ABS operation signal is in an ABS control started state according to a driver's braking will, whether or not the input operation signal of the pedal stroke is in a pedal travel increasing state, and whether or not the input current value of the reaction force of the pedal simulator is a target pressure value needed to generate an ABS pedal feeling; and transmitting an ABS pedal feeling to control a simulator valve to generate an ABS pedal feeling corresponding to a current value of a reaction force of the pedal simulator changed by alternate opening and closing operations of the simulator valve and transmit the ABS pedal feeling to a pedal when the input ABS operation signal is in the ABS control started state, the input operation signal of a pedal stroke is in the pedal travel increasing state, and the current value of the reaction force of the input pedal simulator is the target pressure value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
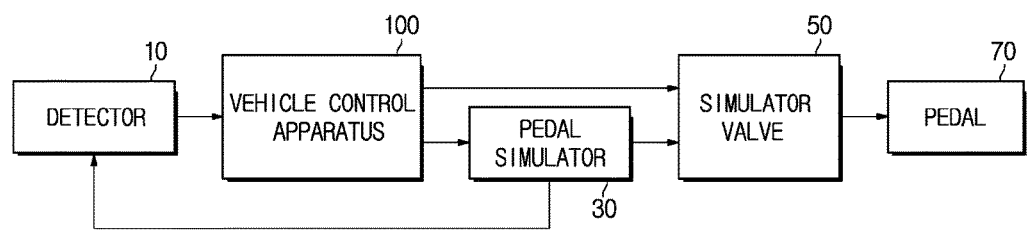
FIG. 1 is a block diagram for describing a state in which a vehicle control apparatus according to one embodiment of the present disclosure is connected to a detector, a pedal simulator, a simulator valve, and a pedal.

Hereinafter, embodiments of the present disclosure will be described in detail with reference to the accompanying drawings. The present embodiments are provided in order to fully explain the spirit and scope of the present disclosure to those skilled in the art. Thus, the present disclosure is not to be construed as limited to the present embodiments set forth herein and may be embodied in other various forms. Parts irrelevant to the description are omitted in the drawings in order to clearly explain the present disclosure. Sizes of elements in the drawings may be exaggerated in order to facilitate understanding.

Figure 2:
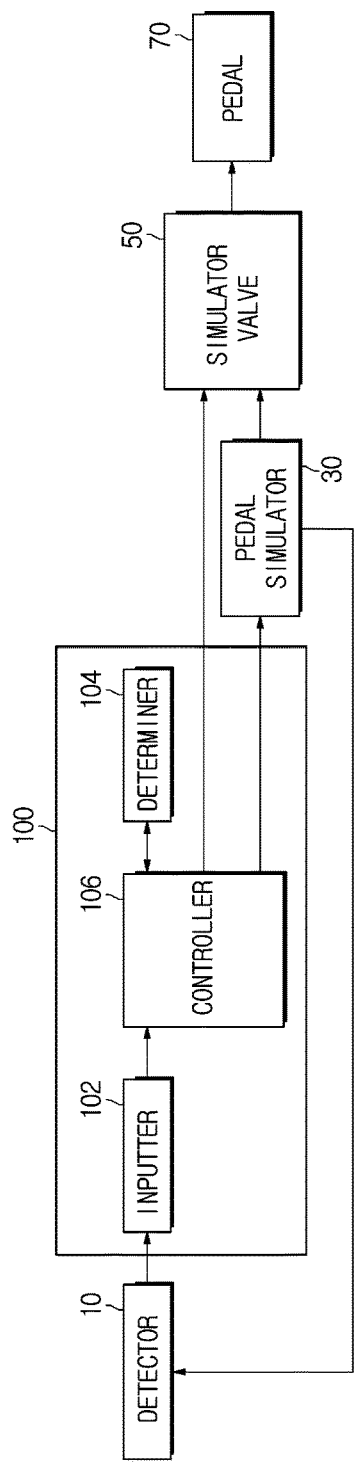
FIG. 2 is a block diagram for describing one example of the vehicle control apparatus described in FIG. 1.

FIG. 1 is a block diagram for describing a state in which a vehicle control apparatus according to one embodiment of the present disclosure is connected to a detector, a pedal simulator, a simulator valve, and a pedal, and FIG. 2 is a block diagram for describing one example of the vehicle control apparatus described in FIG. 1.

Figure 3:
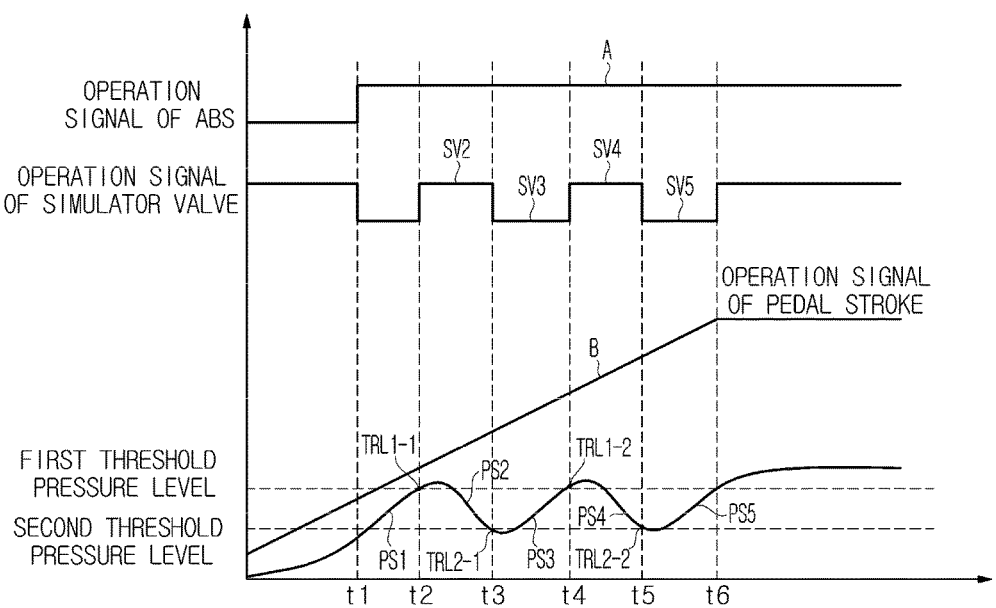
FIG. 3 is a view showing a process in which a controller described in FIG. 2 controls a simulator valve to generate an ABS pedal feeling that correspondingly changes according to a current value of a reaction force of a pedal simulator and to transmit the ABS pedal feeling to a pedal.

FIG. 3 is a view showing a process in which a controller described in FIG. 2 controls a simulator valve to generate an ABS pedal feeling that correspondingly changes according to a current value of a reaction force of a pedal simulator and to transmit the ABS pedal feeling to a pedal.

Figure 4:
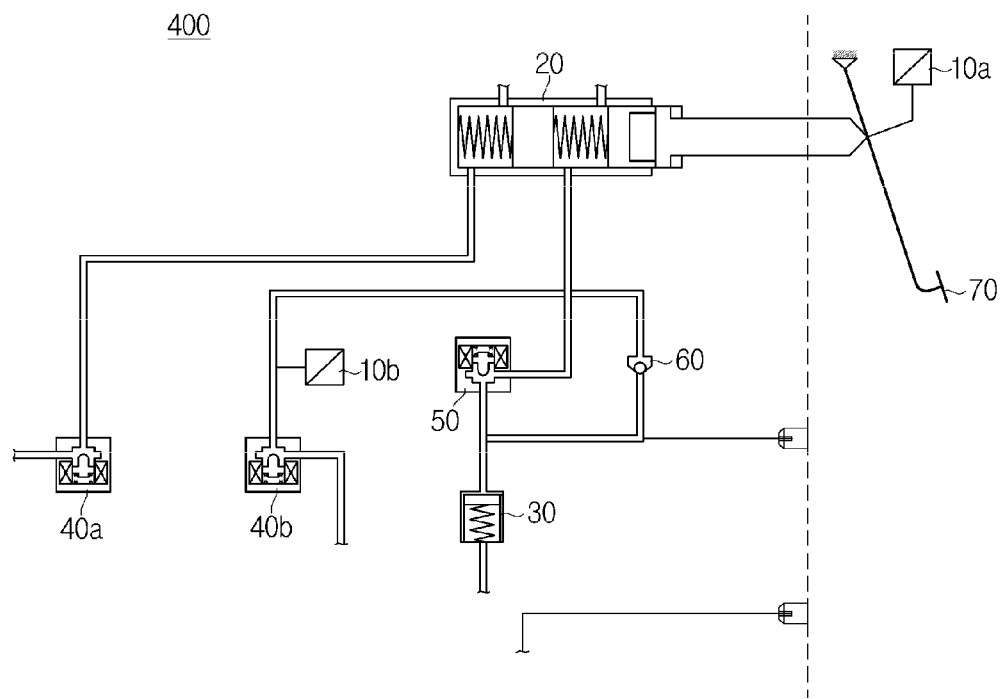
FIG. 4 is a view illustrating one example in which the vehicle control apparatus according to one embodiment of the present disclosure is applied to a brake system.

FIG. 4 is a view illustrating one example in which the vehicle control apparatus according to one embodiment of the present disclosure is applied to a brake system.

Referring to FIGS. 1 to 4, a vehicle control apparatus 100 according to one embodiment of the present disclosure includes an inputter 102, a determiner 104, and a controller 106.

The inputter 102 receives an operation signal of an anti-lock brake system (ABS), an operation signal of a pedal stroke, which are detected by a detector 10, and a current value of a reaction force of a pedal simulator 30.

Here, the detector 10 may include an ABS sensor (not shown) configured to detect the operation signal of the ABS although not illustrated in the drawings, a pedal stroke sensor 10a configured to detect the operation signal of the pedal stroke, and a pedal simulator pressure sensor 10b configured to detect the current value of the reaction force of the pedal simulator 30.

Alternatively, although not illustrated in FIG. 1, the inputter 102 may also receive wheel speed values though wheel speed sensors (not shown) to determine whether or not an ABS starts.

The determiner 104 determines whether or not an ABS operation signal input to the inputter 102 is in an ABS control started state (state A of a section t1 to t6) according to a driver's braking will, on the basis of control of the controller 106 which will be described below.

In addition, the determiner 104 determines whether or not an operation signal of a pedal stroke input to the inputter 102 is in a pedal travel increasing state (state B of the section t1 to t6), on the basis of the control of the controller 106.

That is, when the determiner 104 determines whether or not the operation signal is in the pedal travel increasing state (the state B of section t1 to t6), the operation signal may be determined in the pedal travel increasing state by the determiner 104 when a pedal travel value of an operation signal of a pedal stroke input to the inputter 102 becomes a set target pedal travel value.

In addition, the determiner 104 determines whether or not a current value of a reaction force of the pedal simulator 30 input to the inputter 102 is a target pressure value needed to generate an ABS pedal feeling, on the basis of control of the controller 106.

When the an ABS operation signal is determined in the ABS control started state (the state A of the section t1 to t6) according to a driver's braking will, an operation signal of a pedal stroke is in the pedal travel increasing state (the state B of the section t1 to t6) and a current value of a reaction force of the pedal simulator 30 is determined as the target pressure value needed to generate an ABS pedal feeling set to the determiner 104 by the determiner 104, the controller 106 controls a simulator valve 50 to generate an ABS pedal feeling corresponding to a current value of reaction forces PS1 to PS5 of the pedal simulator 30 changed by alternate opening and closing operations of the simulator valve 50 and to transmit the ABS pedal feeling to a pedal 70.

For one example, as illustrated in FIGS. 2 and 3, the controller 106 may control the simulator valve 50 to generate an ABS pedal feeling corresponding to a current value of a reaction force PS1, PS3, or PS5 of the pedal simulator 30 raised to a first threshold pressure level of target pressure values and to transmit the ABS pedal feeling to the pedal 70 during a closing operation section t1 to t2, t3 to t4, or t5 to t6 of the simulator valve 50.

Here, the controller 106 may transmit an opening operation signal SV2 or SV4 to the simulator valve 50 at a time TPL1-1 or TPL1-2 at which the current value of the reaction force PS1, PS3, or PS5 of the pedal simulator 30 is raised to the first threshold pressure level of the target pressure values.

In addition, the controller 106 may control the simulator valve 50 to generate an ABS pedal feeling corresponding to a current value of the reaction force PS2 or PS4 of the pedal simulator 30 lowered to a second threshold pressure level of the target pressure values and to transmit the ABS pedal feeling to the pedal 70 during an opening operation section t2 to t3, or t4 to t5 of the simulator valve 50.

Here, the controller 106 may transmit a closing operation signal SV3 or SV5 to the simulator valve 50 at a time TPL2-1 or TPL2-2 at which the current value of the reaction force PS2 or PS4 of the pedal simulator 30 is lowered to the second threshold pressure level of the target pressure values.

Accordingly, the ABS pedal feeling corresponding to the current value of the reaction force PS1, PS3, PS5, PS2, or PS4 of the pedal simulator 30 may be rapidly and accurately generated by the opening operation signal SV2 or SV4 and the closing operation signal SV3 or SV5 of the simulator valve 50 according to the time TPL1-1, TPL1-2, TPL2-1, or TPL2-2 at which the current value of the reaction force of the pedal simulator 30 reaches the first or second threshold pressure level, and may be rapidly and accurately transmitted to the pedal 70.

Meanwhile, although not illustrated in the drawings, the inputter 102, the determiner 104, and the controller 106 may be provided in a conventional electronic control unit (ECU, not shown), which is a main computer applied to a vehicle, configured to entirely control and determine an operation, and receive an ABS operation signal, an operation signal of a pedal stroke, and a current value of a reaction force of the pedal simulator 30.

In addition, although not illustrated in the drawings, the inputter 102, the determiner 104, and the controller 106 may be provided in a conventional micro control unit (MCU, not shown) including a processor, a memory, and input and output devices in a single chip to fully control and determine an operation, and receive an ABS operation signal, an operation signal of a pedal stroke, and a current value of a reaction force of the pedal simulator 30.

In addition, although not illustrated in the drawings, the inputter 102, the determiner 104, and the controller 106 are not limited thereto, but may be also provided in any control, determination, and input device capable of entirely controlling and determining an operation of a vehicle, and receiving an ABS operation signal, an operation signal of a pedal stroke, and a current value of a reaction force of the pedal simulator 30.

Here, the inputter 102, the determiner 104, and the controller 106 may be provided in an integrated ECU (not shown) or MCU (not shown), or may also be provided in a separate ECU (not shown) or MCU (not shown).

Meanwhile, as illustrated in FIGS. 2 to 4, the vehicle control apparatus 100 according to one embodiment of the present disclosure may be applied to a brake system 400.

That is, when an ABS operation signal is determined in the ABS control started state (the state A of the section t1 to t6) according to a driver's braking will by the vehicle control apparatus 100 according to one embodiment of the present disclosure, although not illustrated in the drawing, the vehicle control apparatus 100 may perform closing operations of cut valves 40*a* and 40*b* connected to wheels (not shown) and a master cylinder 20 of a vehicle.

Next, when an operation signal of a pedal stroke detected by the pedal stroke sensor 10*a* of the detector 10 is determined in the pedal travel increasing state (the state B of the section t1 to t6) and a current value of a reaction force of the pedal simulator 30 detected by the pedal simulator pressure sensor 10*b* of the detector 10 is determined as the target pressure value needed to generate an ABS pedal feeling by the vehicle control apparatus 100 according to one embodiment of the present disclosure, the vehicle control apparatus 100 may control the simulator valve 50 to generate an ABS pedal feeling corresponding to a current value of reaction forces PS1 to PS5 of the pedal simulator 30 changed by alternate opening and closing operations of the simulator valve 50 and to transmit the ABS pedal feeling to the pedal 70 through the master cylinder 20.

Here, a check valve 60 may prevent a hydraulic pressure from being introduced to the pedal simulator 30 and the simulator valve 50.

A vehicle control method of controlling a vehicle using the vehicle control apparatus 100 according to one embodiment of the present disclosure will be described below with reference to FIG. 5.

Figure 5:
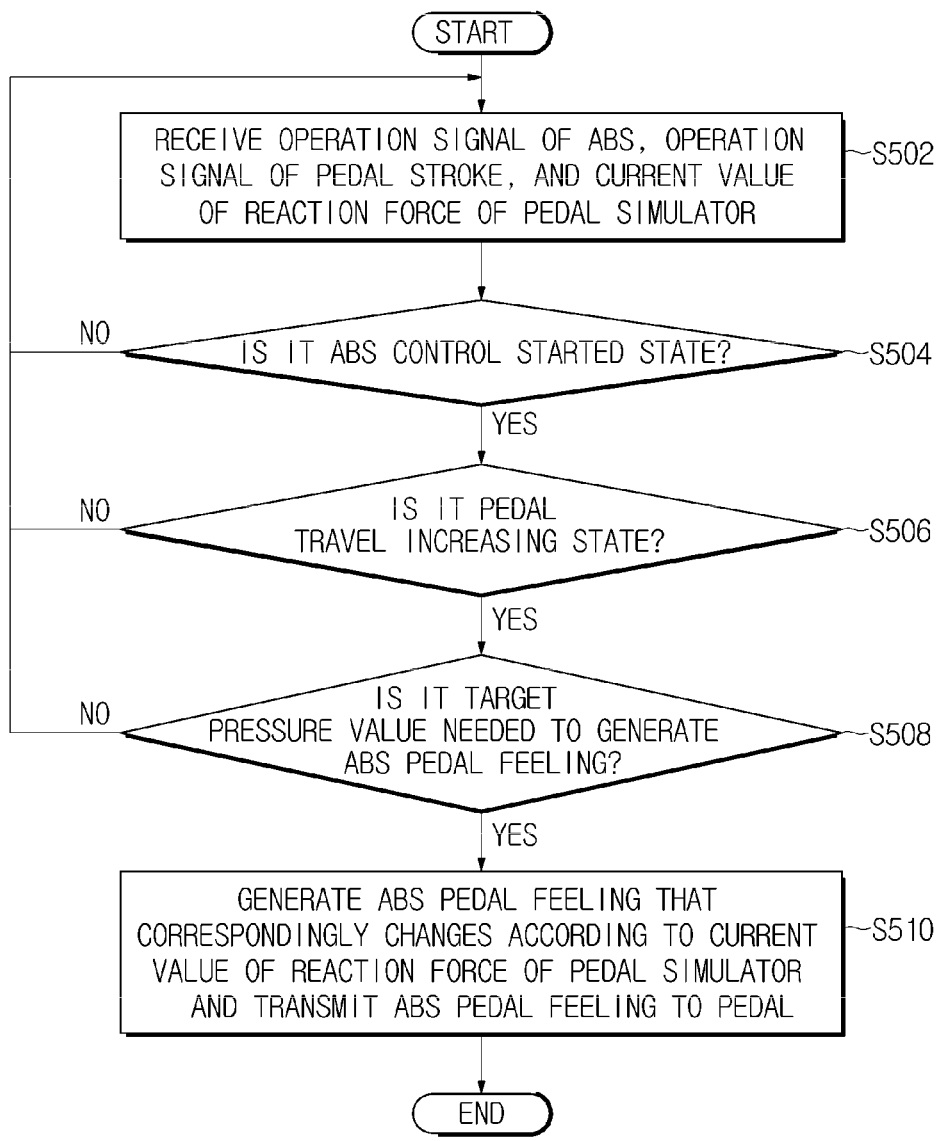
FIG. 5 is a flowchart for describing one example of a vehicle control method of the vehicle control apparatus according to one embodiment of the present disclosure.

FIG. 5 is a flowchart for describing one example of a vehicle control method of the vehicle control apparatus according to one embodiment of the present disclosure.

Referring to FIG. 5, a vehicle control method 500 of the vehicle control apparatus 100 (see FIG. 2) according to one embodiment of the present disclosure includes an inputting operation (S502), determining operations (S504, S506, and S508) and a transmitting operation of an ABS pedal feeling (S510).

First, in the inputting operation (S502), the inputter 102 (see FIG. 2) receives an operation signal of an ABS and an operation signal of a pedal stroke detected by the detector 10 (see FIG. 2), and a current value of a reaction force of the pedal simulator 30 (see FIG. 2).

Next, in the determining operation (S504), the determiner 104 (see FIG. 2) determines whether or not the ABS operation signal input to the inputter 102 (see FIG. 2) is in an ABS control started state (the state A of the section t1 to t6, see FIG. 3) according to a driver's braking will, on the basis of control of the controller 106 (see FIG. 2).

Next, in the determining operation (S506), the determiner 104 (see FIG. 2) determines whether or not the operation signal of a pedal stroke input to the inputter 102 (see FIG. 2) is in a pedal travel increasing state (the state B of the section t1 to t6, see FIG. 3), on the basis of the control of the controller 106 (see FIG. 2).

Next, in the determining operation (S508), the determiner 104 (see FIG. 2) determines whether or not the current value of a reaction force of the pedal simulator 30 (see FIG. 2) input to the inputter 102 (see FIG. 2) is a target pressure value set to the determiner 104 (see FIG. 2) and needed to generate an ABS pedal feeling, on the basis of the control of the controller 106 (see FIG. 2.

Next, in the transmitting operation of an ABS pedal feeling (S510), when the ABS operation signal is determined in the ABS control started state (the state A of the section t1 to t6, see FIG. 3) according to a driver's braking will by the determiner 104 (see FIG. 2), the operation signal of a pedal stroke is in the pedal travel increasing state (the state B of the section t1 to t6, see FIG. 3), and the current value of the reaction force of the pedal simulator 30 (see FIG. 2) is the target pressure value set to the determiner 104 (see FIG. 2) and needed to generate an ABS pedal feeling, the controller 106 (see FIG. 2) controls the simulator valve 50 (see FIG. 2) to generate an ABS pedal feeling corresponding to a current value of reaction forces PS1 to PS5 (see FIG. 3) of the pedal simulator 30 (see FIG. 2) changed by alternate opening and closing operations of the simulator valve 50 (see FIG. 2) and to transmit the ABS pedal feeling to the pedal 70 (see FIG. 2).

For one example, in the transmitting operation of an ABS pedal feeling (S510), the controller 106 (see FIG. 2) may control the simulator valve 50 (see FIG. 2) to generate an ABS pedal feeling corresponding to a current value of a reaction force PS1, PS3, or PS5 (see FIG. 3) of the pedal simulator 30 (see FIG. 2) raised to a first threshold pressure level of target pressure values and to transmit the ABS pedal feeling to the pedal 70 (see FIG. 2) during the closing operation section t1 to t2, t3 to t4, or t5 to t6 (see FIG. 3) of the simulator valve 50 (see FIG. 2).

Here, in the transmitting operation of an ABS pedal feeling (S510), the simulator valve 50 (see FIG. 2) may receive the opening operation signal SV2 or SV4 (see FIG. 3) at the time TPL1-1 or TPL1-2 (see FIG. 3) at which the current value of the reaction force PS1, PS3, or PS5 (see FIG. 3) of the pedal simulator 30 (see FIG. 2) is raised to the first threshold pressure level of the target pressure values.

In addition, in the transmitting operation of an ABS pedal feeling (S510), the controller 106 (see FIG. 2) may control the simulator valve 50 (see FIG. 2) to generate an ABS pedal feeling corresponding to the current value of the reaction force PS2 or PS4 (see FIG. 3) of the pedal simulator 30 (see FIG. 2) lowered to a second threshold pressure level of the target pressure values and to transmit the ABS pedal feeling to the pedal 70 (see FIG. 2) during the opening operation section t2 to t3 or t4 to t5 of the simulator valve 50 (see FIG. 2).

Here, in the transmitting operation of an ABS pedal feeling (S510), the simulator valve 50 (see FIG. 2) may receive the closing operation signal SV3 or SV5 (see FIG. 3) at the time TPL2-1 or TPL2-2 at which the current value of the reaction force PS2 or PS4 (see FIG. 3) is lowered to the second threshold pressure level of the target pressure values of the pedal simulator 30 (see FIG. 2).

Figure 6:
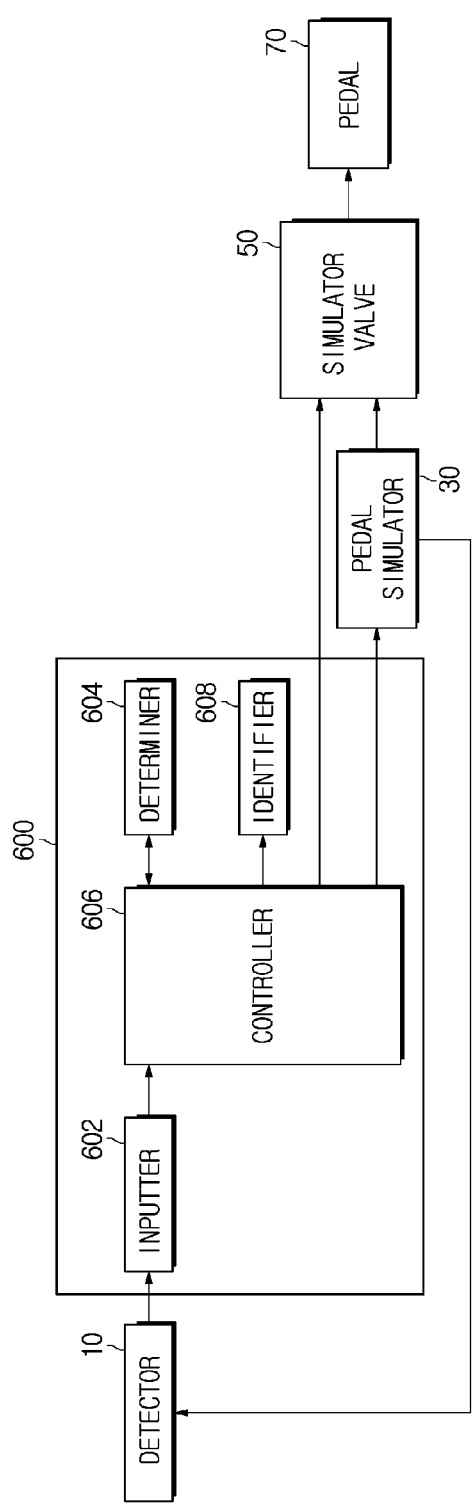
FIG. 6 is a block diagram for describing another example of the vehicle control apparatus according to one embodiment of the present disclosure.

FIG. 6 is a block diagram for describing another example of the vehicle control apparatus according to one embodiment of the present disclosure.

Referring to FIG. 6, a vehicle control apparatus 600 according to one embodiment of the present disclosure includes an inputter 602, a determiner 604, and a controller 606 which are the same as those of the vehicle control apparatus 100 (see FIG. 2).

Accordingly, since functions and organic connection relations of the elements included in the vehicle control apparatus 600 according to one embodiment of the present disclosure are the same as those of the vehicle control apparatus 100 (see FIG. 2), additional descriptions thereof will be omitted below.

Here, the vehicle control apparatus 600 according to one embodiment of the present disclosure may further include an identifier 608.

That is, when a current value of reaction forces PS1 to PS5 (see FIG. 3) of a pedal simulator 30 is determined as a target pressure value set to the determiner 604 and needed to generate an ABS pedal feeling by the determiner 604, the identifier 608 may inform a driver that an ABS pedal feeling is currently in a preparing situation to be generated, according to control of the controller 606.

In addition, when the controller 606 controls a simulator valve 50 to generate the ABS pedal feeling and transmit the ABS pedal feeling to a pedal 70, the identifier 608 may inform the driver that the ABS pedal feeling is currently in a completely generated situation, according to control of the controller 606.

Here, although not illustrated in the drawing, the identifier 608 may include at least one among an alarm (not shown), a speaker (not shown), and a light emitting member (not shown) provided to inform a driver of information or a state of a vehicle and may inform the driver that an ABS pedal feeling is currently in a preparing situation to be generated or the ABS pedal feeling is in a completely generated situation through at least one among an alarm operation of the alarm (not shown), a sounding operation of the speaker (not shown), and a lighting operation of the light emitting member (not shown).

In addition, although not illustrated in the drawing, the identifier 608 may include at least one of a human machine interface (HMI) module (not shown) and a head-up display (HUD) module (not shown) mounted such that a driver interfaces with a machine to check information or a state of a vehicle, and may inform the driver that an ABS pedal feeling is currently in a preparing situation to be generated or the ABS pedal feeling is in a completely generated situation through at least one operation of message display operations of the HMI module (not shown) and the HUD module (not shown).

Vehicle control methods of controlling a vehicle using the vehicle control apparatus 600 according to one embodiment of the present disclosure will be described below with reference to FIGS. 7 and 8.

Figure 7:
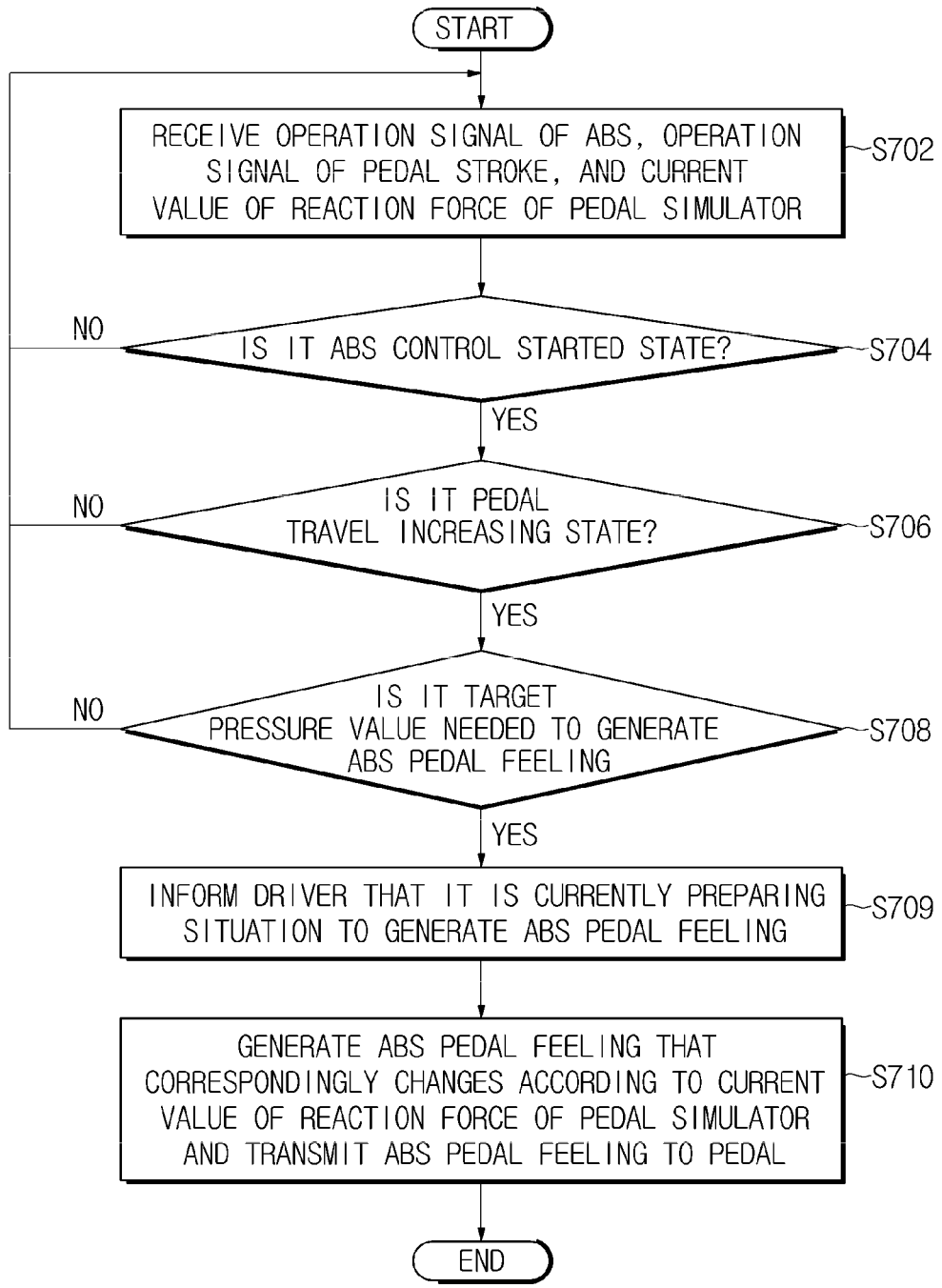
FIG. 7 is a flowchart for describing another example of the vehicle control method of the vehicle control apparatus according to one embodiment of the present disclosure.
Figure 8:
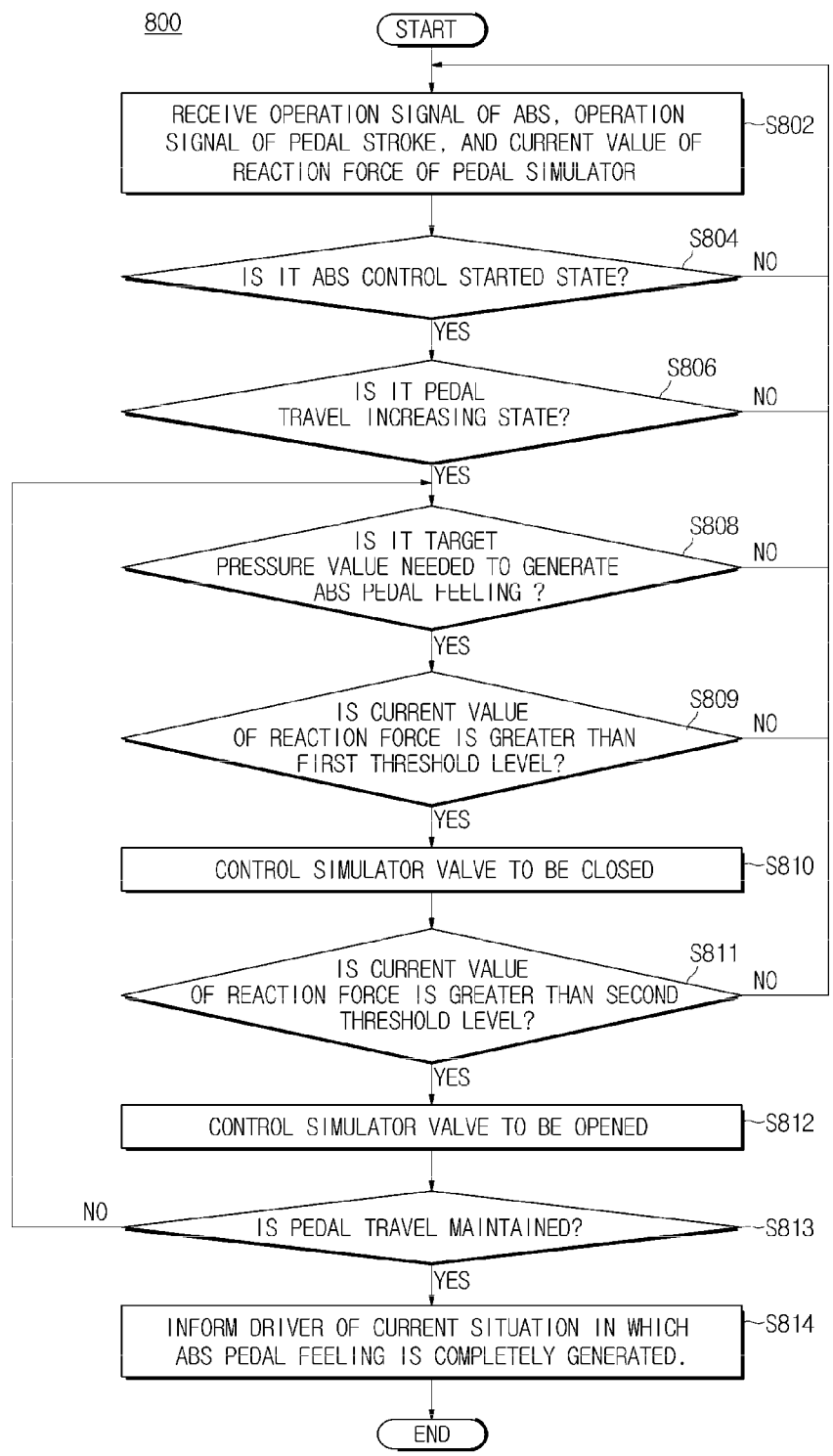
FIG. 8 is a flowchart for describing still another example of the vehicle control method of the vehicle control apparatus according to one embodiment of the present disclosure.

FIG. 7 is a flowchart for describing another example of the vehicle control method of the vehicle control apparatus according to one embodiment of the present disclosure, and FIG. 8 is a flowchart for describing still another example of the vehicle control method of the vehicle control apparatus according to one embodiment of the present disclosure.

First, referring to FIGS. 7 and 8, a vehicle control method 700 of the vehicle control apparatus 600 (see FIG. 6) according to one embodiment of the present disclosure includes an inputting operation (S702) and determining operations (S704, S706, and S708), and a vehicle control method 800 of the vehicle control apparatus 600 (see FIG. 6) according to one embodiment of the present disclosure includes an inputting operation (S802) and determining operations (S804, S806, and S808), wherein the vehicle control methods 700 and 800 are the same as the vehicle control method 500 (see FIG. 5) of the vehicle control apparatus 100 (see FIG. 2). Accordingly, since functions and organic connection relations of elements in the vehicle control methods 700 and 800 of the vehicle control apparatus 600 (see FIG. 6) according to one embodiment of the present disclosure are the same as those in the vehicle control method 500 (see FIG. 5) of the vehicle control apparatus 100 (see FIG. 2), additional descriptions thereof will be omitted below.

Here, the vehicle control method 700 of the vehicle control apparatus 600 (see FIG. 6) according to one embodiment of the present disclosure may further include a first identifying operation (S709).

For one example, the first identifying operation (S709) may be performed after the determining operation (S708) and before a transmitting operation of an ABS pedal feeling (S710).

For another example, although not illustrated in the drawing, the first identifying operation (S709) may be synchronized with the transmitting operation of an ABS pedal feeling (S710) to be performed.

In the first identifying operation (S709), when a current value of reaction forces PS1 to PS5 (see FIG. 3) of the pedal simulator 30 (see FIG. 6) is determined as a target pressure value set to the determiner 604 (see FIG. 6) and needed to generate an ABS pedal feeling by the determiner 604 (see FIG. 6), the identifier 608 (see FIG. 6) may inform a driver that an ABS pedal feeling is currently in a situation to be generated, according to control of the controller 606 (see FIG. 6).

In addition, a second identifying operation (S811) may be performed after a transmitting operation of an ABS pedal feeling (S810).

In the second identifying operation (S811), when the controller 606 (see FIG. 6) controls the simulator valve 50 (see FIG. 6) to generate an ABS pedal feeling and transmit the ABS pedal feeling to the pedal 70 (see FIG. 6), the identifier 608 (see FIG. 6) may inform a driver of a current situation in which the ABS pedal feeling is completely generated according to control of the controller 606 (see FIG. 6).

As described above, the vehicle control apparatus 100 according to one embodiment of the present disclosure includes the inputter 102, the determiner 104, and the controller 106, and the control method 500 thereof performs the inputting operation (S502), the determining operations (S504, S506, and S508), and the transmitting operation of an ABS pedal feeling (S510). The vehicle control apparatus 600 according to one embodiment of the present disclosure includes the inputter 602, the determiner 604, and the controller 606, and the control method 700 thereof performs the inputting operation (S702), the determining operations (S704, S706, and S708), and the transmitting operation of an ABS pedal feeling (S710). In addition, the control method 700 of the vehicle control apparatus 600 according to one embodiment of the present disclosure performs the inputting operation (S802), and the determining operations (S804, S806, and S808).

Accordingly, in the vehicle control apparatus 100 according to one embodiment of the present disclosure and the control method 500 thereof and in the vehicle control apparatus 600 according to one embodiment of the present disclosure and the control method 700 and 800 thereof, since the controller 106 and 606 may control the simulator valve 50 to generate an ABS pedal feeling correspondingly changed according to a current value of reaction forces PS1 to PS5 of the pedal simulator 30 and to transmit the ABS pedal feeling to the pedal 70, when ABS control is started according to a driver's braking will, a realistic ABS pedal feeling desired by the driver can be provided.

In addition, the vehicle control apparatus 600 according to one embodiment of the present disclosure may further include the identifier 608, and each of the control methods 700 and 800 may further perform the first identifying operation (S709).

Accordingly, in the vehicle control apparatus 600 according to one embodiment of the present disclosure and each of the control methods 700 and 800 thereof, a driver may be informed that an ABS pedal feeling is currently in a preparing situation to be generated or the ABS pedal feeling is in a completely generated situation.

Accordingly, in the vehicle control apparatus 600 according to one embodiment of the present disclosure and each of the control method 700 and 800 thereof, since a driver may be informed that an ABS pedal feeling is currently in a preparing situation to be generated or the ABS pedal feeling is in a completely generated situation, the vehicle control apparatus 600 according to one embodiment of the present disclosure and each of the control method 700 and 800 thereof may induce the driver to drive carefully and suppress anxiety about a current ABS pedal feeling that the driver feels.

In addition, as illustrated in FIG. 8, the simulator valve may be controlled to generate an ABS pedal feeling according to whether or not a current value of a reaction force reaches a first threshold level or a second threshold level.

Specifically, the vehicle control method 800 of the vehicle control apparatus 600 (see FIG. 6) according to one embodiment of the present disclosure includes the inputting operation (S802) and the determining operations (S804, S806, and S808) which are the same as those of the vehicle control method 500 (see FIG. 5) of the vehicle control apparatus 100 (see FIG. 2). Next, when a current value of a reaction force is greater than the first threshold level (YES in S809), the simulator valve 50 may be controlled to be closed to decrease the value of a reaction force. Accordingly, when the value of a reaction force is decreased such that the current value of a reaction force is less than the second threshold level (YES in S811), the simulator valve 50 may be controlled to be opened to increase the value of a reaction force.

That is, in the case in which a value of a reaction force is greater than the first threshold level, the simulator valve is closed, and in the case in which the value is less than the second threshold level, the simulator valve is opened, and thus an ABS pedal feeling may be provided. However, in a case in which the pedal travel is in a increasing state (NO in S813 and S806), the ABS pedal feeling is continuously provided to a driver, and in a case in which the pedal travel is maintained (S813) without a change, a current situation in which an ABS pedal feeling is completely generated is informed to the driver (S814).

As is apparent from the above description, a vehicle control apparatus and a control method thereof according to one embodiment of the present disclosure can provide a realistic ABS pedal feeling that a driver wants when ABS control is started according to the driver's braking will.

In addition, a vehicle control apparatus and a control method thereof according to one embodiment of the present disclosure can suppress anxiety about a current ABS pedal feeling that a driver feels while inducing the driver to drive carefully.

Although one embodiment of the present disclosure has been illustrated and described, the present disclosure may not be limited to the above-described specific embodiment and various changes may be made in the present embodiment by those skilled in the art without departing from the scope and spirit of the present disclosure defined by the appended claims, and such modifications may not be individually understood from the present disclosure.

What is claimed is:

1. A vehicle control apparatus comprising:
an inputter configured to receive an operation signal of an anti-lock brake system (ABS) and an operation signal of a pedal stroke which are detected by a detector, and a current value of a reaction force of a pedal simulator;
a determiner configured to determine whether or not the input operation signal of the ABS is in an ABS control started state according to a driver's braking will, whether or not the input operation signal of the pedal stroke is in a pedal travel increasing state, and whether or not the input current value of the reaction force of the pedal simulator is a target pressure value needed to generate an ABS pedal feeling; and
a controller configured to control a simulator valve to generate an ABS pedal feeling corresponding to a current value of a reaction force of the pedal simulator changed by alternate opening and closing operations of the simulator valve and transmit the ABS pedal feeling to a pedal when the input operation signal of the ABS is in the ABS control started state, the input operation signal of the pedal stroke is in the pedal travel increasing state, and the input current value of the reaction force of the pedal simulator is the target pressure value.

2. The vehicle control apparatus of claim 1, wherein the controller controls the simulator valve to generate the ABS pedal feeling corresponding to the current value of the reaction force of the pedal simulator raised to a first threshold pressure level of the target pressure value and transmit the ABS pedal feeling to the pedal during a closing operation section of the simulator valve.

3. The vehicle control apparatus of claim 1, wherein the controller controls the simulator valve to generate the ABS pedal feeling corresponding to the current value of the reaction force of the pedal simulator lowered to a second threshold pressure level of the target pressure value and transmit the ABS pedal feeling to the pedal during an opening operation section of the simulator valve.

4. The vehicle control apparatus of claim 1, wherein the controller transmits an opening operation signal to the simulator valve at a time at which the current value of the reaction force of the pedal simulator reaches a first threshold pressure level of the target pressure value.

5. The vehicle control apparatus of claim 1, wherein the controller transmits a closing operation signal to the simulator valve at a time at which the current value of the reaction force of the pedal simulator reaches a second threshold pressure level of the target pressure value.

6. A vehicle control method comprising:
- inputting an operation signal of an anti-lock brake system (ABS) and an operation signal of a pedal stroke which are detected by a detector, and a current value of a reaction force of a pedal simulator;
- determining whether or not the input ABS operation signal is in an ABS control started state according to a driver's braking will, whether or not the input operation signal of the pedal stroke is in a pedal travel increasing state, and whether or not the input current value of the reaction force of the pedal simulator is a target pressure value needed to generate an ABS pedal feeling; and
- transmitting the ABS pedal feeling to control a simulator valve to generate the ABS pedal feeling corresponding to the current value of the reaction force of the pedal simulator changed by alternate opening and closing operations of the simulator valve and transmit the ABS pedal feeling to a pedal when the input ABS operation signal is in the ABS control started state, the input operation signal of the pedal stroke is in the pedal travel increasing state, and the current value of the reaction force of the input pedal simulator is the target pressure value.

7. The vehicle control method of claim 6, wherein the transmitting the ABS pedal feeling comprises controlling the simulator valve to generate the ABS pedal feeling corresponding to the current value of the reaction force of the pedal simulator raised to a first threshold pressure level of the target pressure value and transmit the ABS pedal feeling to the pedal during a closing operation section of the simulator valve.

8. The vehicle control method of claim 6, wherein the transmitting the ABS pedal feeling comprises controlling the simulator valve to generate the ABS pedal feeling corresponding to the current value of the reaction force of the pedal simulator lowered to a second threshold pressure level of the target pressure value and transmit the ABS pedal feeling to the pedal during an opening operation section of the simulator valve.

9. The vehicle control method of claim 6, wherein the transmitting the ABS pedal feeling comprises transmitting an opening operation signal to the simulator valve at a time at which the current value of the reaction force of the pedal simulator reaches a first threshold pressure level of the target pressure value.

10. The vehicle control method of claim 6, wherein the transmitting the ABS pedal feeling comprises transmitting a closing operation signal to the simulator valve at a time at which the current value of the reaction force of the pedal simulator reaches a second threshold pressure level of the target pressure value.

* * * * *